US011548577B2

(12) United States Patent
Abdellatif et al.

(10) Patent No.: US 11,548,577 B2
(45) Date of Patent: Jan. 10, 2023

(54) CRAWLER VEHICLE WITH AUTOMATIC PROBE NORMALIZATION

(71) Applicants: SAUDI ARABIAN OIL COMPANY, Dhahran (SA); KING ABDULLAH UNIVERSITY OF SCIENCE AND TECHNOLOGY, Thuwal (SA)

(72) Inventors: Fadl Abdellatif, Thuwal (SA); Abdoulelah Al-Hannabi, Thuwal (SA); Sahejad Patel, Thuwal (SA); Mohamed Abdelkader, Thuwal (SA); Jeff S. Shamma, Thuwal (SA)

(73) Assignees: SAUDI ARABIAN OIL COMPANY, Dhahran (SA); King Abdullah University Of Science And Technology, Thuwal (SA)

( * ) Notice: Subject to any disclaimer, the term of this patent is extended or adjusted under 35 U.S.C. 154(b) by 616 days.

(21) Appl. No.: 16/689,797

(22) Filed: Nov. 20, 2019

(65) Prior Publication Data
US 2020/0172184 A1  Jun. 4, 2020

Related U.S. Application Data

(60) Provisional application No. 62/772,700, filed on Nov. 29, 2018.

(51) Int. Cl.
*B62D 57/024* (2006.01)
*B60K 1/02* (2006.01)
(Continued)

(52) U.S. Cl.
CPC ............ *B62D 57/024* (2013.01); *B60G 3/01* (2013.01); *B60G 11/00* (2013.01); *B60K 1/02* (2013.01);
(Continued)

(58) Field of Classification Search
CPC ...... B62D 57/024; B60G 3/01; G01N 29/225; G01N 29/2487
See application file for complete search history.

(56) References Cited

U.S. PATENT DOCUMENTS 5,220,869 A * 6/1993 Pelrine ................. B62D 57/024
                                                    301/5.1
9,201,047 B1 * 12/2015 Walton ................. G01N 29/225
(Continued)

FOREIGN PATENT DOCUMENTS

CN     202624434 U    12/2012
CN     206704338 U    12/2017
(Continued)

OTHER PUBLICATIONS

Leon-Rodriguez, Hernando, Salman Hussain, and Tariq Sattar. "A compact wall-climbing and surface adaptation robot for non-destructive testing." 2012 12th International Conference on Control, Automation and Systems. IEEE, 2012.
(Continued)

*Primary Examiner* — James A English
(74) *Attorney, Agent, or Firm* — Leason Ellis LLP

(57) ABSTRACT

A robotic vehicle for traversing surfaces comprises a chassis having a plurality of wheels mounted thereto. Two magnetic drive wheels are spaced apart in a lateral direction and rotate about a rotational axis while a stabilizing wheel is provided in front of or behind the two drive wheels. The drive wheels are configured to be driven independently, thereby driving and steering the vehicle along the surface. The vehicle also includes a sensor probe assembly that is supported by the chassis and configured to take measurements of the surface being traversed. In accordance with a salient aspect, the vehicle includes a probe normalization mechanism that is configured to determine the surface curvature and adjust the orientation of the probe transducer as a function of the
(Continued)

curvature of the surface, thereby maintaining the probe at the preferred inspection angle irrespective of changes in the surface curvature with vehicle movement.

15 Claims, 9 Drawing Sheets

(51) Int. Cl.
| | |
|---|---|
| B62D 21/09 | (2006.01) |
| B60G 3/01 | (2006.01) |
| B60G 11/00 | (2006.01) |
| B62D 61/12 | (2006.01) |
| B60R 11/00 | (2006.01) |
| G01N 29/265 | (2006.01) |
| G01N 29/04 | (2006.01) |
| B62D 9/00 | (2006.01) |
| B64C 25/24 | (2006.01) |
| B64C 25/36 | (2006.01) |
| B64C 25/40 | (2006.01) |
| B64C 39/02 | (2006.01) |
| B64D 1/02 | (2006.01) |
| G01B 17/02 | (2006.01) |
| G05D 1/00 | (2006.01) |
| G05D 1/10 | (2006.01) |
| B64C 25/32 | (2006.01) |
| G06T 7/50 | (2017.01) |
| G01S 17/86 | (2020.01) |
| G01S 17/89 | (2020.01) |
| H04N 5/222 | (2006.01) |
| G06V 20/10 | (2022.01) |

(52) U.S. Cl.
CPC .............. *B60R 11/00* (2013.01); *B62D 9/002* (2013.01); *B62D 21/09* (2013.01); *B62D 61/12* (2013.01); *B64C 25/24* (2013.01); *B64C 25/32* (2013.01); *B64C 25/36* (2013.01); *B64C 25/405* (2013.01); *B64C 39/02* (2013.01); *B64C 39/024* (2013.01); *B64D 1/02* (2013.01); *G01B 17/02* (2013.01); *G01N 29/04* (2013.01); *G01N 29/265* (2013.01); *G01S 17/86* (2020.01); *G01S 17/89* (2013.01); *G05D 1/0088* (2013.01); *G05D 1/0094* (2013.01); *G05D 1/101* (2013.01); *G06T 7/50* (2017.01); *G06V 20/10* (2022.01); *H04N 5/2226* (2013.01); *B60R 2011/004* (2013.01); *B60R 2011/008* (2013.01); *B60R 2011/0084* (2013.01); *B64C 2201/027* (2013.01); *B64C 2201/12* (2013.01); *B64C 2201/123* (2013.01); *B64C 2201/127* (2013.01); *B64C 2201/141* (2013.01); *B64C 2201/18* (2013.01); *G01N 2291/0289* (2013.01); *G01N 2291/02854* (2013.01); *G06T 2207/10028* (2013.01)

(56) References Cited

U.S. PATENT DOCUMENTS

| | | |
|---|---|---|
| 10,343,276 B2 | 7/2019 | Zanini et al. |
| 11,021,198 B2* | 6/2021 | Carrasco Zanini ... B60B 19/006 |
| 2014/0197829 A1 | 7/2014 | Szielasko et al. |
| 2015/0153312 A1 | 6/2015 | Gonzalez et al. |
| 2016/0238565 A1 | 8/2016 | Gonzalez et al. |
| 2018/0275102 A1* | 9/2018 | Carrasco Zanini .. G01N 29/225 |
| 2019/0017656 A1 | 1/2019 | Zanini et al. |
| 2020/0030962 A1* | 1/2020 | Georgeson ........... B25J 11/0085 |
| 2020/0041074 A1* | 2/2020 | Carrasco Zanini .. B62D 57/024 |
| 2022/0176736 A1* | 6/2022 | Abdellatif ............ G01N 29/225 |

FOREIGN PATENT DOCUMENTS

| | | |
|---|---|---|
| EP | 0346473 A1 | 12/1987 |
| JP | S63149557 A | 6/1988 |
| KR | 101002434 B1 | 12/2010 |

OTHER PUBLICATIONS

Park, Sangdeok, Hee Don Jeong, and Zhong Soo Lim. "Design of a mobile robot system for automatic integrity evaluation of large size reservoirs and pipelines in industrial fields." Proceedings 2003 IEEE/RSJ International Conference on Intelligent Robots and Systems (IROS 2003)(Cat. No. 03CH37453). vol. 3. IEEE, 2003.
International Search Report and Written Opinion in corresponding PCT Application No. PCT/US2019/063446, dated Mar. 10, 2020. 13 pages.
ThetaScan Little Wing Data Sheet.
International Preliminary Report on Patentability in Corresponding PCT Application No. PCT/US19/63446, dated Feb. 18, 2021. 20 pages.

* cited by examiner

CRAWLER VEHICLE WITH AUTOMATIC PROBE NORMALIZATION

CROSS-REFERENCE TO RELATED APPLICATION

The present application claims the benefit of U.S. Provisional Application No. 62/772,700, titled PERCHING UAV WITH RELEASABLE CRAWLER, filed on Nov. 29, 2018 with the U.S. Patent and Trademark Office, which is hereby incorporated by reference in its entirety.

FIELD OF THE DISCLOSURE

The present invention relates to robotic vehicles and, in particular, robotic inspection vehicles having a magnetic drive wheels and an inspection probe for inspecting a surface traversed by the vehicle.

BACKGROUND OF THE DISCLOSURE

Routine inspection of equipment is critical in most industries in order to ensure safety and optimize performance. For example, in the petroleum industry and related fields, liquids and gases and mixtures thereof are transported via pipelines and these materials are also stored in large tanks.

It is known in this industry that in order to maintain the integrity of pipelines, storage tanks and the like, a sensor device can be employed to inspect such surfaces. In particular, an inspection vehicle can be used to travel across a surface of the target object (e.g., a pipe or tank) and record information about the quality of the pipe wall. A majority of these inspection vehicles use ultrasonic or magnetic sensors to carry out the inspection. Based on the recorded information, any cracks or other deficiencies in the surface being inspected (e.g., pipe wall) can be detected and noted to allow for subsequent remedial action to be taken.

In the past, there have been different inspection vehicle designs that are used to inspect various structures, such as factory equipment, ships, underwater platforms, pipelines and storage tanks. If a suitable inspection vehicle is not available to inspect the structure, an alternative is to build scaffolding that will allow people access to inspect these structures, but at great cost and danger to the physical safety of the inspectors. Past inspection vehicles have lacked the control, maneuverability and compact packaging (i.e., size) necessary to inspect such surfaces effectively.

In addition, while there are a number of different sensors that can be used in such inspection vehicles, one preferred type of ultrasonic sensor is a dry coupled probe (DCP) that is configured to perform ultrasonic inspection of the surface to measure wall thickness and detect corrosion. Dry coupled probes are typically built in the form of a wheel in which a shaft (axle) is meant to be held fixed since the shaft has the transducer component rigidly embedded in it while an outer tire rotates around the shaft. The shaft of the probe thus is preferably held and positioned such that the transducer always points at the surface, meaning that the wheel is not titled in its roll and pitch directions.

It is with respect to these and other considerations that the disclosure made herein is presented.

SUMMARY OF THE DISCLOSURE

According to an aspect of the present invention, a magnetic robotic crawler vehicle for traversing a surface is disclosed. The vehicle comprises a chassis and a plurality of wheels mounted to the chassis that support the chassis while traversing the surface. In particular, the plurality of wheels include two spaced apart magnetic drive wheels that are spaced apart in a lateral direction and rotate about a rotational axis. The drive wheels are configured to be driven independently, thereby driving and steering the vehicle along the surface. (For reference, the vehicle has a longitudinal axis that extends perpendicularly to the rotational axis in a front and back direction and through the midpoint between the two wheels.) Also included is a stabilizing wheel that is spaced apart from the two magnetic drive wheels in the longitudinal direction and configured to roll along the surface. The vehicle also includes a sensor probe assembly that is supported by the chassis and a probe normalization mechanism coupled to the at least the sensor probe assembly. The probe normalization mechanism is configured to maintain at least a probe transducer of the sensor probe assembly at a prescribed angle relative to the surface during normal operation of the vehicle as a function of a curvature of the surface.

These and other aspects, features, and advantages can be appreciated from the accompanying description of certain embodiments of the invention and the accompanying drawing figures and claims.

BRIEF DESCRIPTION OF THE DRAWING FIGURES

DESCRIPTION OF CERTAIN EMBODIMENTS OF THE DISCLOSURE

Figure 1A:
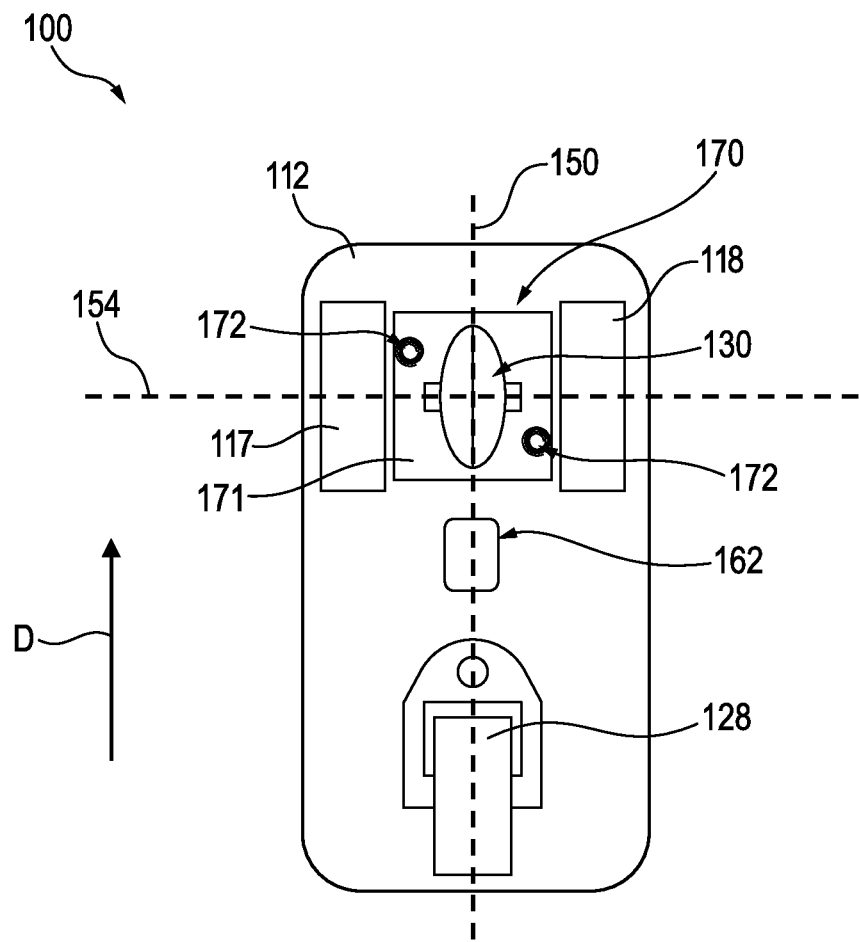
FIG. 1A is a bottom-view diagram of a magnetic robotic crawler vehicle in accordance with one or more disclosed embodiments.

By way of overview and introduction, a compact magnetic robotic crawler vehicle having an automatic probe normalization mechanism is disclosed. The vehicle is configured to be capable of traversing ferromagnetic surfaces of almost any curvature with high dexterity and maneuverability regardless of surface geometry and orientation and to perform inspection of the traversed surface using inspection sensors.

While there are a number of different sensors that can be used in such inspection vehicles, one preferred type of ultrasonic sensor is a dry coupled probe (DCP) that is configured to perform ultrasonic inspection of the surface to measure characteristics of the traversed structure, for example, wall thickness and detect corrosion. Dry coupled probes are typically built in the form of a wheel in which a shaft (axle) is meant to be held fixed since the shaft has the transducer component rigidly embedded in it while an outer tire rotates around the shaft. The shaft of the probe thus is preferably held and positioned such that the transducer always points at the surface, meaning that the wheel is not titled in its roll and pitch directions.

In practice, different surface curvatures necessitate the rotational adjustment of the wheel's shaft to make sure its transducers are pointing directly towards the surface to be inspected to ensure proper measurement. This process of calibrating the probe angle is referred to as normalization. Normalizing the probe is typically a manual process. For example, when inspecting pipes, normalization has to be performed for every different pipe diameter. Moreover, inspecting a pipe circumferentially imposes a certain curvature but inspecting longitudinally is effectively equivalent to inspecting a flat surface. Therefore, the transition between both cannot be done seamlessly and manual normalization has to be done before completing the transition.

Thus, one of the challenges in using a DCP is that the probe is preferably maintained perpendicular (normal) to the surface being inspected and this can be a challenge while the inspection vehicle is mobile and navigating the surface. A further challenge is to maintain the probe in close proximity or in contact with the surface being inspected. This is especially difficult since the inspection vehicle can drive circumferentially, longitudinally and helically on a pipe or tank surface, which means that the DCP has to be realigned to ensure that the DCP is normal to the surface being inspected regardless of the location of the inspection vehicle.

The disclosed embodiments provide a solution for providing vehicular movement in non-gravity-dependent operations, where the impact of gravity on vehicle movement can be minimized while still enabling versatile control. As well, the disclosed embodiments are also directed to a mechanism (device/apparatus) that stabilizes, maintains an appropriate height of the sensor and normalizes the sensor (e.g., a DCP) relative to the surface being inspected when inspection is being performed and while the inspection vehicle is being steered and/or moved in a variety of different tracks along the surface and despite a varying range of degrees of curvature of the surface. In some exemplary embodiments, the probe angle is normalized by controlling the orientation of the probe relative to the vehicle's chassis. In addition or alternatively, the probe can have a fixed orientation relative to the chassis and probe normalization involves adjusting the attitude of the vehicle relative to the surface. The foregoing aspects of the crawler and, as further described herein, address multiple major challenges that are common in the development of inspection crawlers while simultaneously reducing the overall size and weight of the inspection vehicle.

Figure 1B:
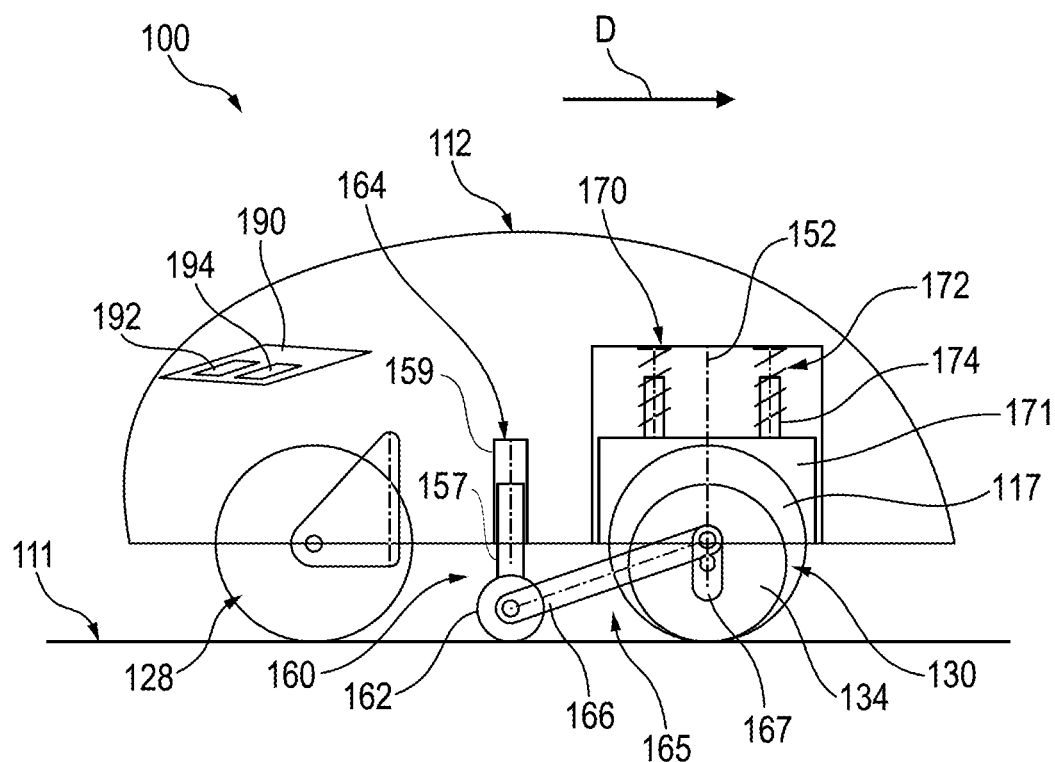
FIG. 1B is a side-view diagram of the magnetic robotic crawler vehicle of FIG. 1A in accordance with one or more disclosed embodiments.
Figure 1C:
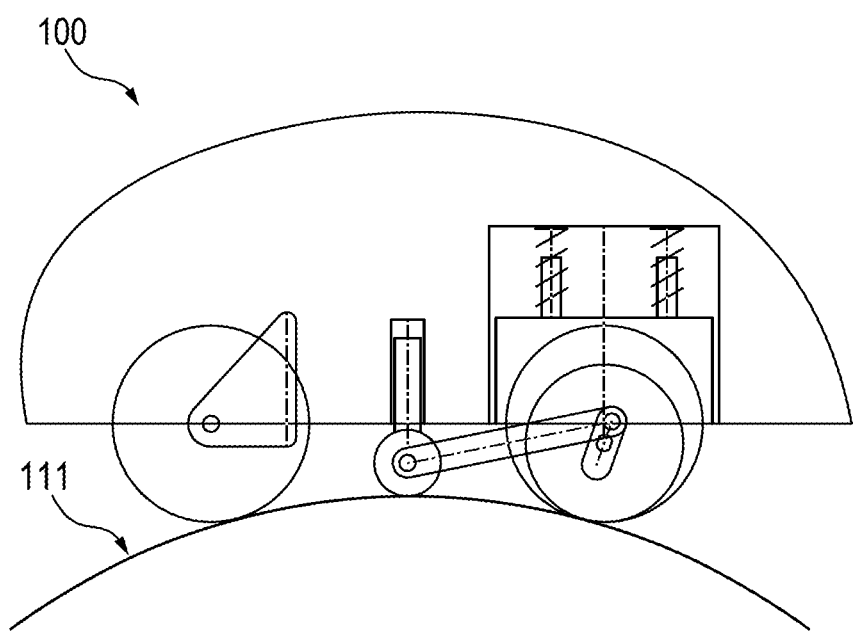
FIG. 1C is a side-view diagram of the magnetic robotic crawler vehicle of FIGS. 1A-1B in accordance with one or more disclosed embodiments.

Referring to FIG. 1A-1C, an exemplary robotic crawler vehicle 100 in accordance with an embodiment of the invention is shown. FIG. 1A provides a simplified bottom view of the vehicle 100 with certain components omitted. FIGS. 1B and 1C provide a simplified side view of the vehicle 100 traversing on a flat surface 111 and curved surface 111, respectively. As shown, the vehicle 100 can be in the form of a three-wheeled magnetic crawler inspection vehicle that can be controllably driven across the surface 111. For example, the vehicle 100 can be a robotic device for inspection of one or more regions of the surface 111 using one or more on-board sensor probes wherein the vehicle can be controlled by a user who can transmit commands to the vehicle to control the operation of the vehicle. In this manner, the user can effectively drive the vehicle across the surface and can stop and steer the vehicle as well. The vehicle can also be configured to drive autonomously as well.

The robotic vehicle 100 includes a first chassis section 112. Two magnetic drive wheels 117 and 118 are supported by the first chassis section. Also mounted to the first chassis section is a stabilization wheel 128 that stabilizes the vehicle. Stabilization wheel 128 could be a caster wheel, a caster ball or an omni-wheel. In FIGS. 1A and 1B, the crawler configuration is illustrated using a caster wheel 128 as an example.

As noted, each drive wheel can be magnetized so as to allow the robotic inspection vehicle 100 to magnetically attach to a ferromagnetic metal surface 111, such as a metal pipe or metal storage tank and be movable thereacross. In order to maintain the caster wheel 128 in contact with the surface 11, the caster ball can be magnetized as well. It should be appreciated that, depending on the particular configuration or direction of vehicle travel, the rear stabilization wheel 128 can be located in-front of and, therefore, leading the drive wheels rather than following. It should also be appreciated that the exemplary chassis, drive wheel and stabilization wheel arrangements described herein are not intended to be limiting. Alternative vehicle, drive wheel and stabilizing wheel configurations can be implemented without departing from the scope of the disclosed embodiments.

In the robotic vehicle's forward direction of travel, which is indicated by arrow "D," the drive wheels 117 and 118 of the robotic vehicle rotate about an axis 154 in either direction in response to a motor that propels the vehicle forward and backwards. The axis of rotation 154 of the drive wheels is also referred to as the lateral axis 154, which runs widthwise through the first chassis section 112. Perpendicular to the lateral axis and extending lengthwise through the middle of the first chassis section (e.g., parallel to a flat surface that the crawler is on and bisecting the vehicle into left and right sides/halves) is the longitudinal axis 150. Also shown in FIG. 1B is the perpendicular axis 152, which extends perpendicularly to both the longitudinal axis and the lateral axis and is normal to the surface 111 (when the crawler is resting on a flat surface).

It can also be appreciated that each drive wheel can be independently actuated and configured to propel the vehicle in the forward and rearward direction as well as steer the vehicle, as further described herein. The spaced apart drive wheels provide stability to the vehicle 100. In addition, the drive wheels can include a strong magnet which creates a pull force between the wheels and a ferromagnetic surface 111 on which the vehicle can be moved, and this structural arrangement assists in resisting tipping of the vehicle.

Although not shown in its entirety in the figures, the vehicle can include a control module. The control module can include a motor, a drive assembly for transferring mechanical power from the motor to the drive wheels 117 and 118, a power source (e.g., battery). The control module can also include, as shown in FIG. 1B, a controller 190. The controller includes a processor 192, which is configured by executing instructions in the form of code that are stored on a computer readable non-transitory storage medium 194. The controller can electronically control operation of the vehicle by, inter alia, processing sensed data from sensors, processing stored instructions, and generating control instruction/signals for any number of different electronically controlled components that are commonly found on robotic vehicles such as motors, actuators and the like.

Automatic Probe Normalization Mechanism

Provided between the left wheel 118 and right wheel 117 is a sensor support assembly or "probe carrier" 170 for mounting an inspection probe assembly 130 to the first chassis section 112 of the vehicle 100. In the exemplary embodiments described herein, the sensor probe assembly 130 is a roller sensor probe (e.g., a DCP as previously described) configured to roll along the surface being inspected and capture sensor measurements.

Figure 2A:
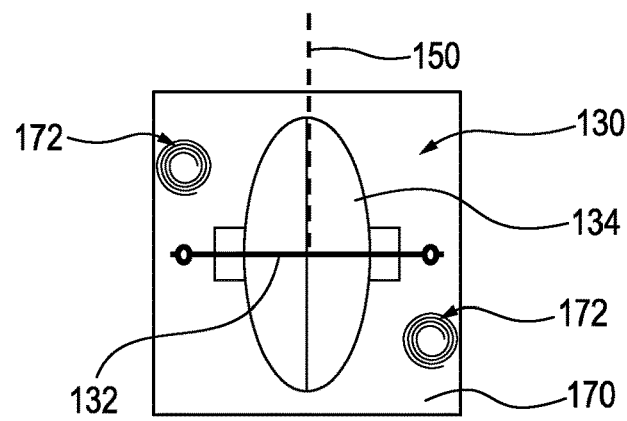
FIG. 2A is a simplified bottom view diagram of an exemplary sensor probe assembly of the magnetic robotic crawler vehicle of FIGS. 1A-1C in accordance with one or more disclosed embodiments.
Figure 2B:
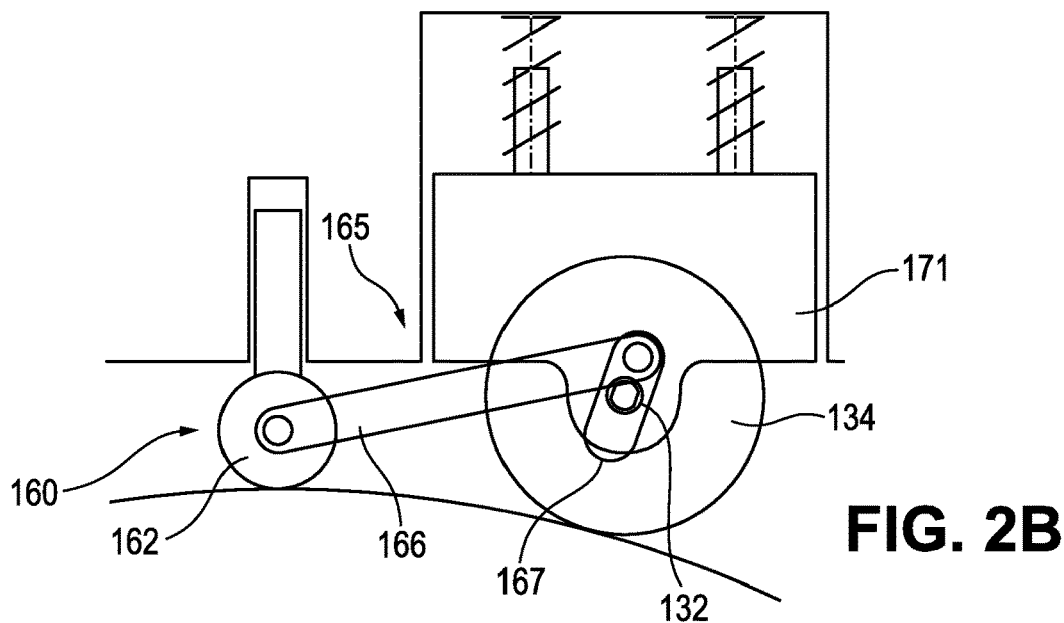
FIG. 2B is a simplified side view diagram of an exemplary sensor probe and probe carrier assembly of the magnetic robotic crawler vehicle of FIGS. 1A-1C in accordance with one or more disclosed embodiments.

Turning briefly to FIGS. 2A and 2B, which are a close-up simplified bottom-view and side-view of the probe assembly 130, respectively. The probe 130 is an assembly that includes a probe wheel 134, which rotates about a fixed probe transducer shaft 132. The probe transducer shaft is generally oriented along the axis of rotation of the outer probe wheel, which is also generally parallel to the axis of rotation of the drive wheels 117 and 118 (not shown).

Preferably, the probe wheel 134 provided at the mid-point of the vehicle in the lateral direction (e.g., along the longitudinal axis).

According to a salient aspect of one or more of the disclosed embodiments, the probe carrier 170 supports the probe assembly 130 and configured to maintain the probe wheel 134 in contact with or close to the surface during operation and can move the probe assembly 130 in at least an up and down direction so as to compensate for different surface curvatures and the fact that the curved surface creeps (e.g., curves or crowns closer to the vehicle) in between the spaced apart wheels when driving helically or longitudinally on a pipe.

FIG. 2A is a bottom plan view that illustrates an exemplary configuration of the probe carrier 170 mounting system. In this configuration, the probe carrier 170 comprises a platform-like carrier structure 171 that the probe wheel assembly is mounted to. More specifically, the rotating axle of the probe wheel is supported at each end by the platform 171. The probe carrier platform 171 is moveably mounted to the chassis thereby providing for self-adjustment of the probe wheel's position in the up/down direction relative to the surface 111 using vertically sliding shafts 174, which are spring-assisted by springs 172. More specifically, the opposing ends of the rotating axle 132 of the probe wheel can be mounted to the probe carrier platform 171, say, using roller bearings (not shown). FIG. 2B, is a close-up side view of the probe carrier 170 assembly and showing the platform-like carrier structure 171 that the probe wheel axel 132 is mounted to and also showing the auto-normalization mechanism 160 further described below. Furthermore, FIGS. 2A-2B and 1A-1C depict two compression springs 172 that extend between the chassis and the floating probe carrier assembly platform 171. The spring expansion force applied between the chassis and the probe carrier, which can be guided by one or more shafts 174 extending from the probe carrier 170 to the chassis, serves to adjust the height of the probe assembly 130 and thus maintain the probe wheel 134 in contact with the surface 111. As shown, one of the springs 172 is provided in front of the rotating axles and the other spring is provided behind, however, the exact number of springs and placement of the springs is not critical, so long as the carrier 170 is spring biased and is pushed downward to maintain the wheel 134 in contact with the surface.

Although the up and down movement of the probe wheel provided by the probe carrier 170 is generally passive, the movement can be biased or assisted using springs and the like. For example and without limitation, FIG. 2A depicts compression springs 172 that are each disposed around a length of a respective shaft (not shown) and compressed against the chassis 112 (not shown). The spring force pushing against the chassis and floating platform serve to maintain the probe wheel 134 in contact with the surface by effectively pushing the probe assembly towards the surface during operation and self-adjusting the height of the probe wheel to accommodate changes in curvature. In addition or alternatively, the force maintaining the probe wheel 134 against the surface can be provided using magnets, for instance, roller wheel magnets disposed on the left and right side of the wheel 134. The exemplary configurations of the probe assembly 130 and self-adjusting probe carrier 170 are provided as a non-limiting example and alternative mounting systems can be used to support different types of inspection probes and provide movement of the probe in one or more degrees of freedom.

Figure 2C:
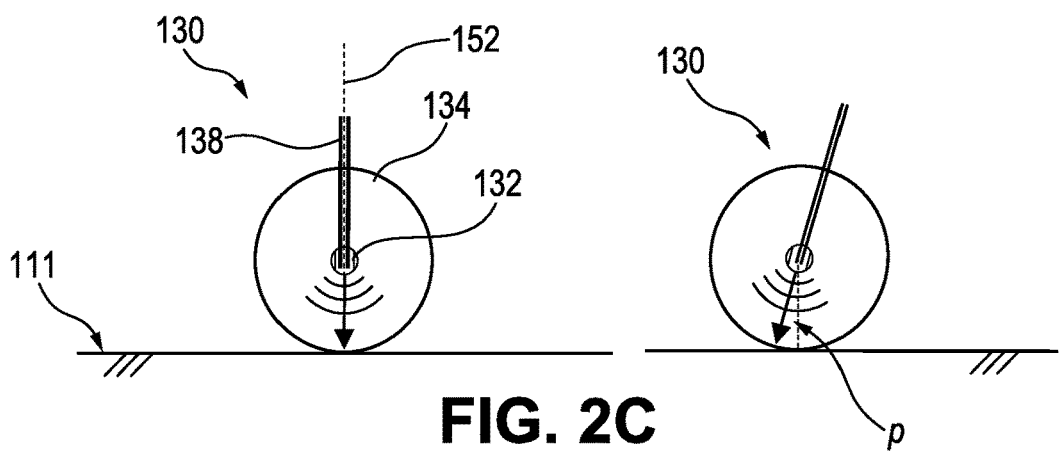
FIG. 2C is a simplified side view diagram of an exemplary sensor probe assembly of the magnetic robotic crawler vehicle of FIGS. 1A-1C and showing an alternative probe mounting configuration in accordance with one or more disclosed embodiments and showing a proper, normalized probe angle (left image) and improper normalization (right image)

In another exemplary configuration shown in FIG. 2C, the rotating axle of the probe wheel can be supported at each end by two vertically oriented shafts 138. Although the particular mounting configuration is not shown, the vertically oriented shafts 138 can be slideably mounted to the chassis 112 or probe carrier 170. For instance, the shafts 138 can be mounted to the probe carrier or chassis using respective linear bearings (not shown) that enable the shafts to move in the up/down direction therethrough and thus, allows the probe wheel to move in the up and down directions.

With regards to normalization of the probe's inspection angle, it should be noted that placing the wheel probe in the middle of the crawler (i.e., along the longitudinal axis 150) and in between the two drive wheels significantly simplifies issues related to alignment of the probe against the pipe. This placement of the probe basically reduces the normalization problem from a three Degree of Freedom challenge to a specific one DoF challenge where the only challenge to overcome would be the front/back inspection angle p of the probe transducer, which is addressed by the auto-probe normalization mechanism described herein. Furthermore, placement of the wheel probe in the center of the crawler can eliminate issues related to the probe wheel 134 dragging sideways as it can occur in other crawlers (unless the probe is lifted off the pipe before steering). Accordingly, the exemplary crawler vehicles disclosed herein are capable of continuously taking probe readings while carrying out maneuvers without needing to lift the probe off the pipe (i.e., by simply pivoting about the probe when steering).

As noted, normalized contact is preferably maintained between the traversed surface 111 and the rolling sensor probe wheel 134 because, for example, a DCP generally requires its internal transducer component to be normal to the inspected surface in order to acquire a clean measurement. For example, FIG. 2C illustrates the probe transducer properly normalized with the surface 111 (shown to the left) and with the probe angle p not properly normalized, e.g., not perpendicular to the surface (shown to the right). Thus, in accordance with the disclosed embodiments, the vehicle 100 includes an auto-normalization mechanism 160 that provides passive normalization of the probe against the surface 111.

In the exemplary embodiment shown in FIGS. 1A-1C, the normalization mechanism 160 can include a surface curvature "sensing" device or mechanism. In particular, vehicle 100 includes a passive floating wheel, caster ball 162, mounted somewhere in the center of the crawler. As shown, the caster ball 162 is preferably provided along the longitudinal axis 150 and preferably at the mid-point between the rear support caster 128 and the drive wheels 117 and 118. The caster ball 162 is supported by a linearly sliding support assembly 164 configured to maintain the caster ball 162 against the surface 111. For instance, the linearly sliding support assembly 164 can include a shaft 157 that the caster ball 162 is mounted to at one end, and that is configured to slide linearly within an outer shaft housing 159 mounted to the chassis 112. Accordingly, the linearly sliding support assembly 164 can be configured to allow the castor ball to move linearly in the up/down direction relative to the chassis as a function of the curvature of the surface 111. For instance, in the embodiment shown in FIG. 1B, the caster ball is shown at a "low" position relative to the chassis when the vehicle is traversing a flat surface 111. As shown in FIG. 1C, the caster ball moves closer to the chassis 112 when traversing a curved surface 111. Accordingly, it can be appreciated that the smaller the pipe diameter (i.e., the more surface curvature), the closer the caster ball is to the chassis.

In order to maintain the caster ball 162 in contact with the surface 11, the caster ball can be magnetized. In addition or alternatively, the linearly sliding support 164 can be biased, e.g. with springs (not shown), to provide adequate push force between the sliding shaft and chassis to ensure the caster ball 162 remains in contact with the surface.

While a passively rolling ball-caster 162 is shown and described in connection with FIGS. 1A-1C, any device that is suitable for contacting and being moved along the surface 111 can be utilized, for instance, a wheel rotating about a fixed rotational axis that is parallel to the rotational axis 154 of the drive wheels 117 and 118.

As noted, the linearly floating caster ball 162 is preferably moveable relative to the first chassis section 112 in at least the up/down direction. It should be understood that, depending on the configuration of the vehicle, the support assembly 164 can be configured to moveably support the caster ball 162 with greater degrees of freedom. It should be also understood that other mechanisms for supporting such a floating wheel and allowing it to move in one or more directions as a function of the surface curvature can be utilized.

Returning now to FIGS. 1A-1C and with continued reference to FIGS. 2A and 2B, as noted, the automatic probe normalization mechanism 160 is configured to adjust the angle p of the probe 130 relative to the surface 111 as a function of the surface curvature, thereby facilitating proper orientation of the probe transducer shaft 132 for capturing measurements. In the exemplary configuration shown in FIGS. 1B-1C, the normalization mechanism 160 can include a mechanical linkage 165 configured to translate the mechanical motion of the floating caster ball 162, which moves up and down as a function of surface curvature, into rotation of the probe transducer shaft so as to adjust the probe angle p, i.e., make the probe transducer 132 point more directly towards the surface 111, thereby providing passive and automatic normalization.

One exemplary configuration of the mechanical linkage 165 can include a slider-crank linkage that links the translational motion of the caster ball to the angle of the probe transducer element, as seen in FIG. 1B. The elements of the slider-crank linkage include a linkage arm 166, which is pivotably mounted at one end to the caster ball 162, for instance, at the caster ball's axle, such that it pivots freely relative to the caster ball. The linkage arm 166 is also pivotably mounted at the other end to a second linkage arm 167. The second linkage arm 167 is fixedly mounted to the probe transducer shaft 132 such that rotating the second linkage arm changes the probe orientation and, as shown, is oriented in the same direction as the inspection direction of the probe's transducer.

The geometry of the slider-crank linkage, including the length of linkage arms 166 and 167 and relative position of their respective mounting points, are designed to ensure proper alignment of the probe with the surface to achieve a normalized probe angle p for a range of pipe diameters and, preferably, with minimum deviation through its range of motion. As the linkages are designed between two extremes, there could be a small deviation between the translation position of the caster ball and the corresponding corrected angle of the probe. Consequently, the characteristics of the slider-crank linkage motion allow the inspection direction of the wheel probe 130 to remain generally perpendicular to the traversed surface (i.e., "normalized" or in a "normal orientation" in one or more directions relative to the surface 111) during operation.

Figure 3A:
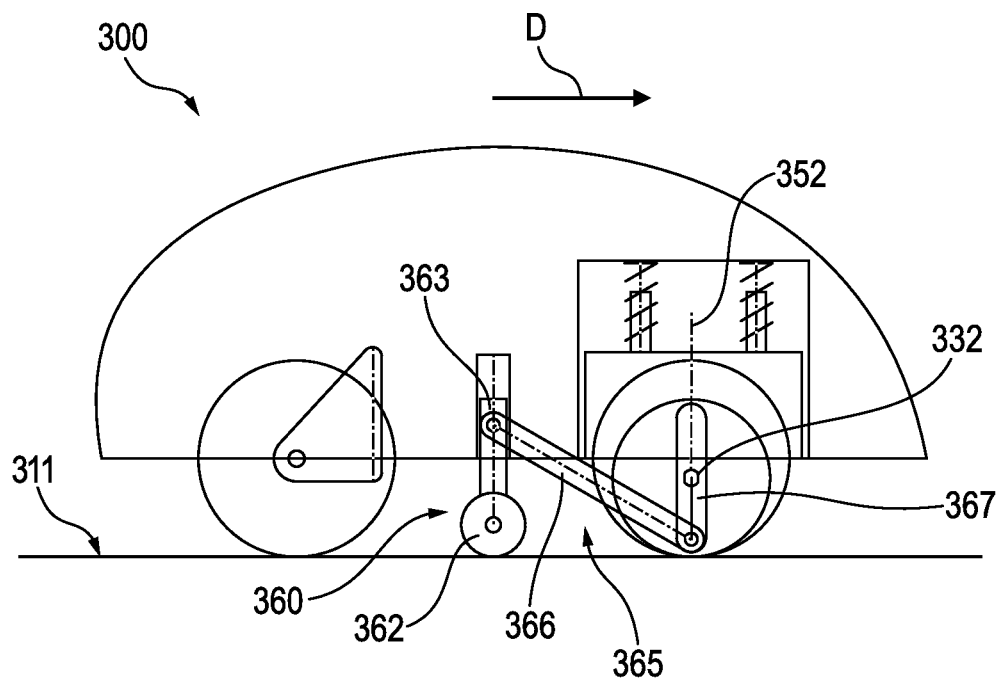
FIG. 3A is a side-view diagram of a magnetic robotic crawler vehicle in accordance with one or more disclosed embodiments.
Figure 3B:
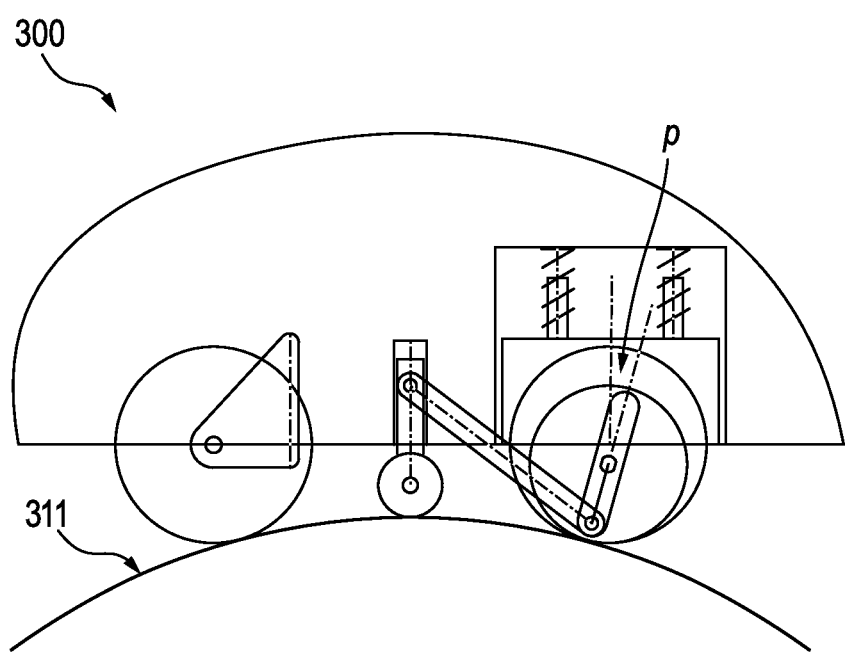
FIG. 3B is a side-view diagram of the magnetic robotic crawler vehicle of FIG. 3A in accordance with one or more disclosed embodiments.

The exemplary auto-probe normalization mechanisms described above are provided as non-limiting examples. Other configurations for a probe normalization mechanism can be used without departing from the scope of the disclosed embodiments. For example, FIGS. 3A and 3B illustrate a vehicle 300 including another exemplary arrangement for a probe normalization mechanism 360 comprising a slider-crank linkage 365 traversing a flat surface in FIG. 3A and a curved surface in FIG. 3B. The exemplary slider-crank linkage 365 can offer improved control over the inspection angle deviation p relative to the surface normal 352 throughout the range of motion of the castor ball 362 and curvature of the surface 311. More specifically, as shown, the first slider-crank linkage arm 366 is shown as being pivotably attached at one end to the linearly sliding shaft 363. Additionally, the second slider-crank linkage arm 367 is elongated, as compared to the embodiment shown in FIG. 1A-1C, and pivotably coupled to the first linkage arm 366 at an end proximate to the surface 311 and otherwise fixedly coupled to the transducer shaft 332, similar to the embodiment of FIG. 1A-1C.

Figure 4A:
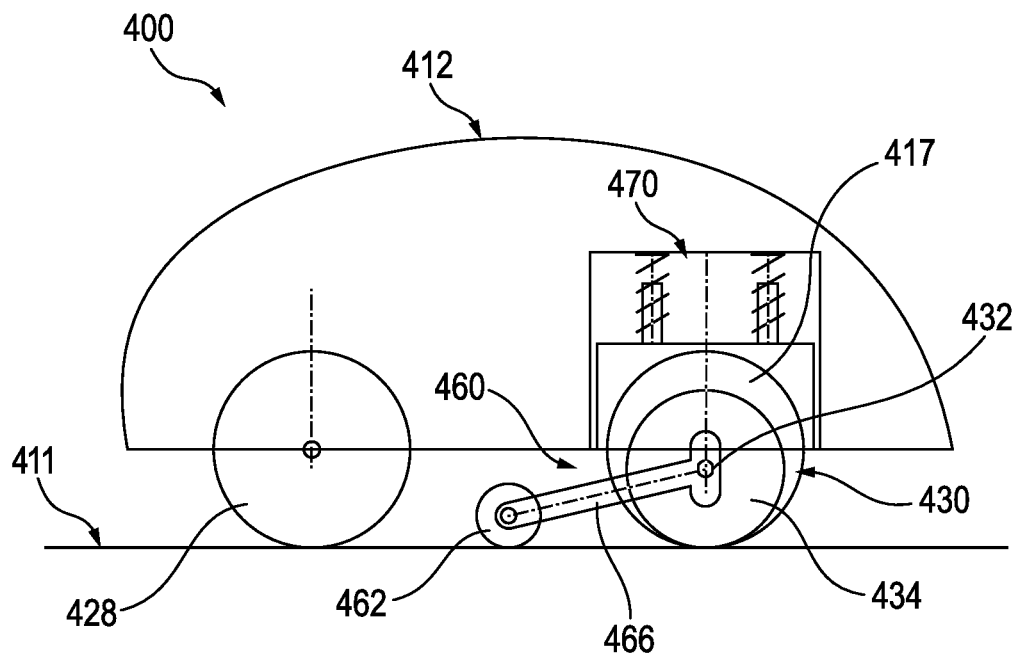
FIG. 4A is a side-view diagram of a magnetic robotic crawler vehicle in accordance with one or more disclosed embodiments.
Figure 4B:
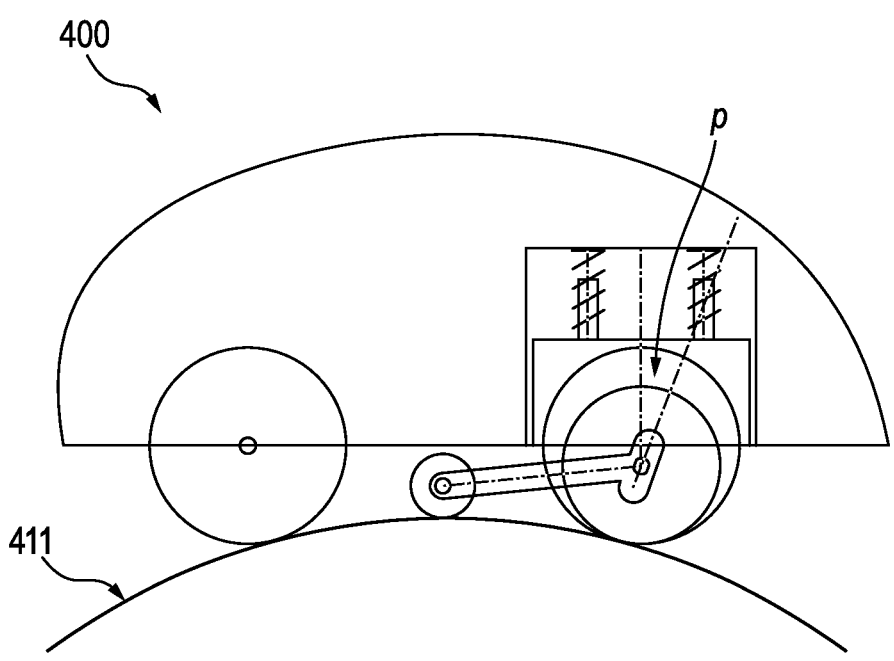
FIG. 4B is a side-view diagram of the magnetic robotic crawler vehicle of FIG. 4A in accordance with one or more disclosed embodiments.

FIGS. 4A and 4B further illustrate a vehicle 400 having another exemplary configuration of a passive probe normalization mechanism 460. The vehicle 400 is shown while traversing a flat surface in FIG. 4A and a curved surface in FIG. 4B. The vehicle 400 has the same basic configuration as the vehicle 100 shown and described in connection with FIGS. 1A-1C, namely, two spaced apart magnetic drive wheels (only one wheel 417 shown), a stabilizing caster wheel 428 and a sensor probe assembly 430 positioned between the two drive-wheels and mounted to a probe carrier assembly 470, which is a spring-biased device allowing for passive height adjustment of the probe wheel so as to maintain contact with the surface 511.

The vehicle 400 also includes a simplified linkage system for providing passive normalization of the probe angle. The normalization mechanism 460 comprises a linkage arm 466, wherein the curvature adjusting caster ball 462 is mounted at one end of the arm and the arm is mounted to the probe wheel shaft 432 at the other end. The geometry of the linkage arm 466 and the normalization mechanism 460 more generally can be configured such that, when the surface is flat, the contact point between the surface 411 and the rear caster wheel 428, drive wheels 417 and caster ball 462 are co-planar and the probe wheel is normalized such that its transducer points at the surface 411 at the preferred inspection angle (e.g., is perpendicular to the surface). As the curvature increases (e.g., pipe diameter decreases), the caster ball 462 moves toward the chassis 412 as shown in FIG. 4B and as a result, the linkage arm 466, which is fixedly mounted at the probe wheel will start turning the probe transducer shaft 432 due to the curved surface effectively lifting the caster ball relative to the other wheels. This yields an angular rotation in the probe shaft 432, thereby aligning the probe transducer with the surface 411 to achieve proper normalization. Some residual normalization error can occur, but by configuring the vehicle with proper link dimensions and hinge positions, the error can be minimized to an acceptable range.

Figure 5A:
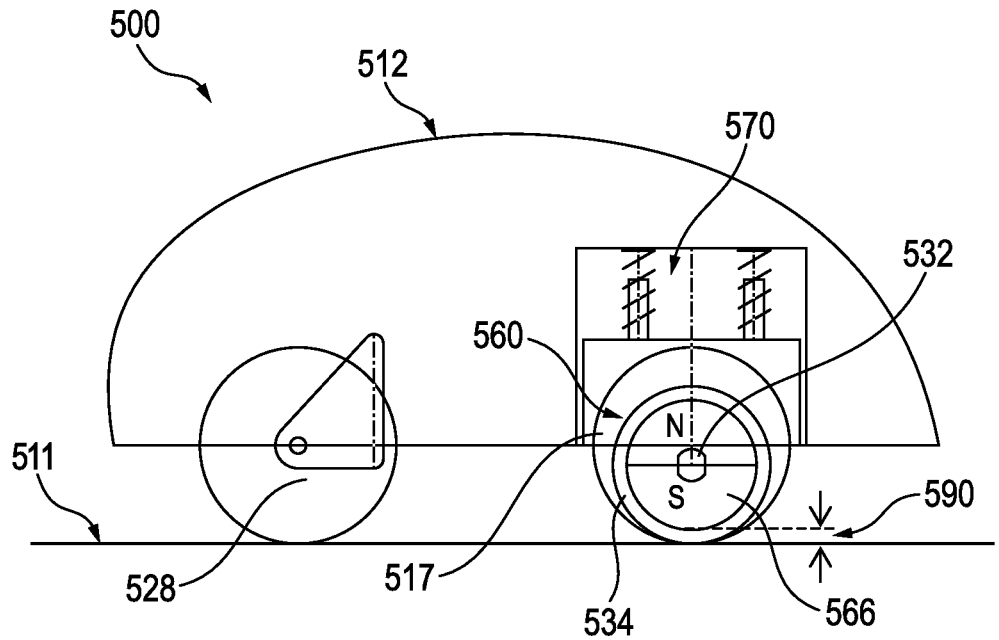
FIG. 5A is a side-view diagram of a magnetic robotic crawler vehicle in accordance with one or more disclosed embodiments.
Figure 5B:
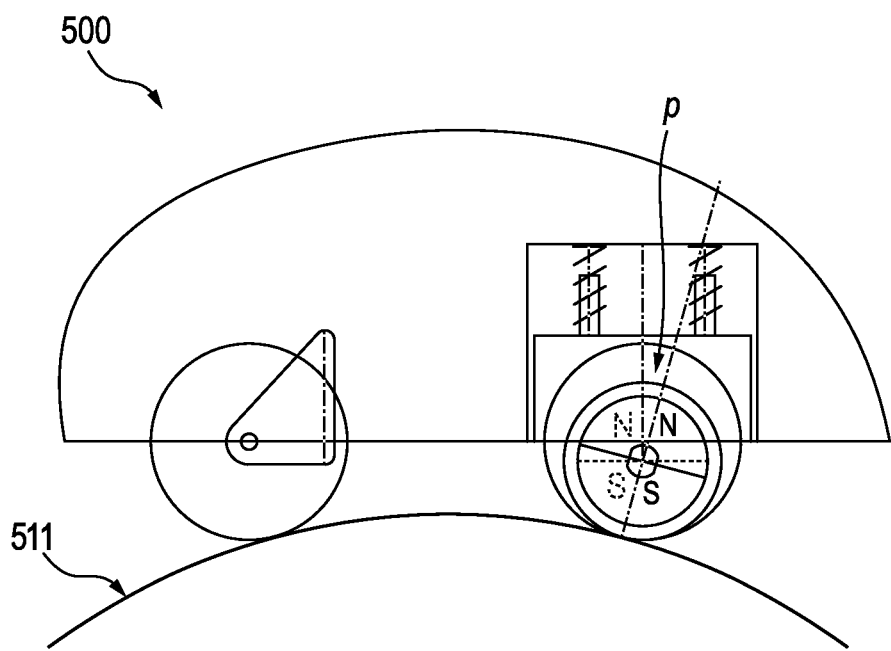
FIG. 5B is a side-view diagram of the magnetic robotic crawler vehicle of FIG. 5A in accordance with one or more disclosed embodiments.

FIGS. 5A and 5B are side views of a crawler vehicle 500 incorporating another exemplary configuration of a probe normalization mechanism 560. The vehicle 500 is shown while traversing a flat surface 511 in FIG. 5A and a curved surface 511 in FIG. 5B. The vehicle 500 has the same basic configuration as the vehicle 100 shown and described in connection with FIGS. 1A-1C, namely, two spaced apart magnetic drive wheels (only one wheel 517 shown), a stabilizing caster wheel 528 and a sensor wheel probe 530 positioned between the two drive-wheels and mounted to a probe carrier assembly 570, which is a spring-biased device allowing for passive height adjustment of the probe wheel so as to maintain contact with the surface 511.

The automatic probe normalization mechanism 560 is configured to adjust the probe orientation relative to the chassis so as to normalize the probe transducer shaft 532 relative to the surface. In the exemplary configuration shown in FIGS. 5A-5B, the probe normalization mechanism 560 can include a magnetic ring 566 coupled to the transducer shaft 532 of the probe wheel 534 and designed to rotate the probe transducer. In particular, the magnetic ring diameter is designed to leave a small air gap 590 between the magnet and ferrous surface 511, thereby allowing the magnet to align itself with the magnetic field affected by the ferrous surface. As shown in FIG. 5B, rotation of the magnet to maintain magnetic alignment with the ferrous surface 511 serves to rotate the transducer shaft thereby providing passive normalization of the probe transducer with the surface 511. Additionally, the probe shaft or magnet ring can be fitted with a mechanical stopper for preventing over-rotation of the magnet, e.g., preventing the magnet from rotating 180 degrees.

Figure 6A:
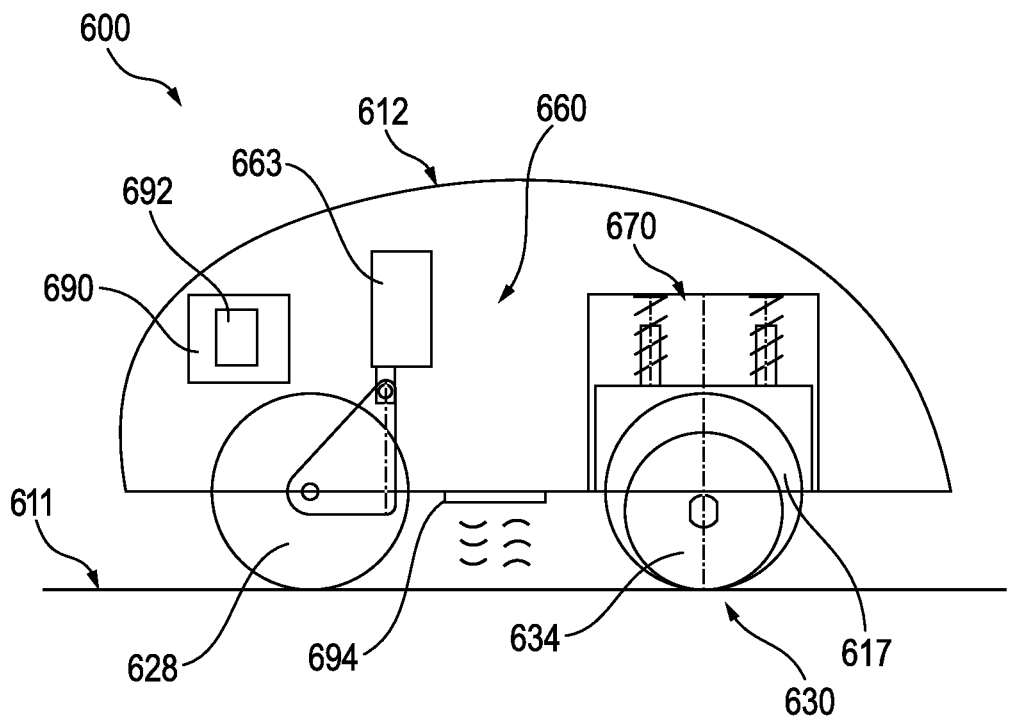
FIG. 6A is a side-view diagram of a magnetic robotic crawler vehicle in accordance with one or more disclosed embodiments.
Figure 6B:
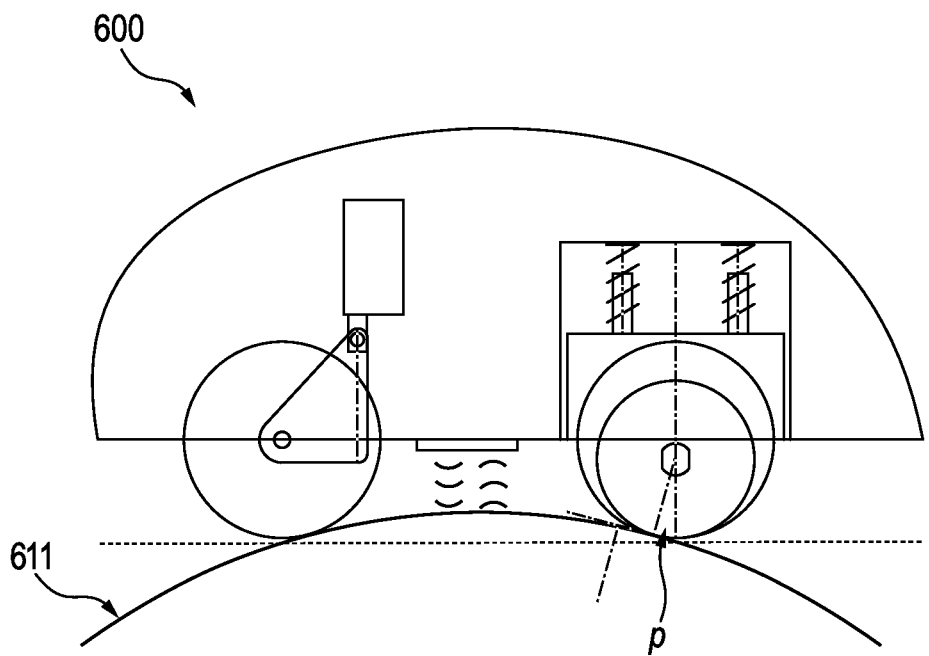
FIG. 6B is a side-view diagram of the magnetic robotic crawler vehicle of FIG. 6A in accordance with one or more disclosed embodiments.
Figure 6C:
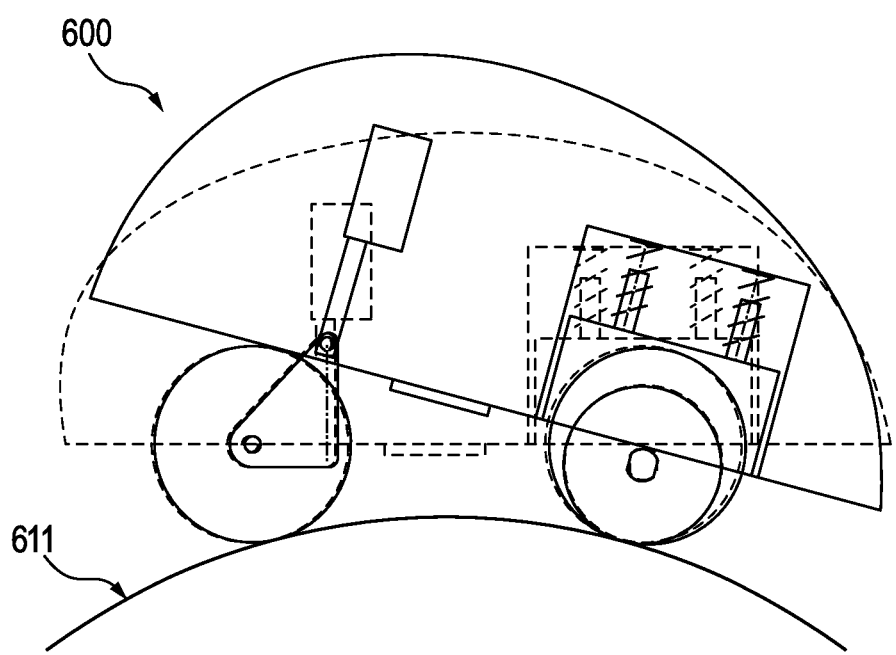
FIG. 6C is a side-view diagram of the magnetic robotic crawler vehicle of FIG. 6A-6B in accordance with one or more disclosed embodiments.

FIGS. 6A-6C are side views of a crawler vehicle 600 incorporating another exemplary arrangement for a probe normalization mechanism 660. The vehicle 600 is shown while traversing a flat surface 611 in FIG. 6A and a curved surface 611 in FIGS. 6B-6C. The vehicle 600 has the same basic configuration as the vehicle 100 shown and described in connection with FIGS. 1A-1C, namely, two spaced apart magnetic drive wheels (only one wheel 617 shown), a stabilizing caster wheel 628 and a sensor wheel probe 630 positioned between the two drive-wheels and mounted to a probe carrier 670, which is a spring-biased device allowing for passive height adjustment of the probe wheel 674 so as to maintain contact with the surface 611.

However, whereas previously described embodiments included probe normalization mechanisms that passively adjusted the orientation of the probe relative to the chassis and traversed surface, the vehicle 600 is configured such that the probe 630 is maintained at a generally fixed orientation relative to the chassis 612 and the probe normalization mechanism 660 is configured to adjusts the attitude of the chassis so as to adjust the orientation of the probe 630 relative to the surface 611 over a range of surface curvatures, thereby maintaining the proper inspection angle p of the probe transducer shaft 632 for capturing measurements In the exemplary configuration shown in FIGS. 6A-6B, the probe normalization mechanism 660 can include one or more distance measuring sensors 694 mounted to the underside of the chassis 612 and configured to measure the distance from the sensor to the surface 611. As shown, the sensor can be placed in the middle between the vehicle supporting wheels, e.g., drive wheels 617 and caster wheel 628. Furthermore, the vehicle control computer 690 (or an external computing device in communication with the robot) that, using a processor 692, can be configured to use the measured distance, the known geometry of the vehicle (e.g., the size and relative position of the vehicle's wheels and their relative position to the probe) to determine the surface curvature and, as a result, how much the orientation of the probe needs to be adjusted in order for the probe inspection angle p to be the same as the desired inspection angle (e.g., perpendicular to the surface being inspected 611).

The vehicle 600 also includes an actuator 663 that is configured to align the directional probe 630 in order to achieve the desired inspection angle. Many types of actuators can be used to perform such alignment. For example, in the embodiment shown in FIG. 6A, the trailing caster wheel 628 can be mounted to the end of a shaft of a linear actuator 663, which is mounted to the chassis 612. The control computer 690 can, based on the calculated surface curvature, be configured to cause the linear actuator 663 to extend the shaft thereby lifting the chassis 612 of the crawler at the trailing end. As a result, the chassis 612 is pivoted about the axis of the drive wheels thus changing the angle of the probe, which is maintained in a fixed orientation relative to the chassis, such that the probe is normal to the surface of interest 611. Additionally, the feedback measurements from the distance sensor can be corelated by the control computer 690 to reflect the diameter of the pipe and the required linear actuator adjustment needed to align the probe. FIG. 6B illustrates the exemplary vehicle 600 on a curved surface prior to normalization of the probe angle p. FIG. 6C illustrates the exemplary vehicle 600 on the same curved surface after normalization of the probe angle p by pivoting the chassis about the drive wheel axis.

In addition or alternatively to the foregoing exemplary embodiments for passively and automatically normalizing a probe relative to an inspected surface, any type of powered actuator or motor can be used to perform or otherwise assist the actuation and adjustment of the probe's angle relative the surface. For example, the normalization mechanism can include an actuator or a motor connected to a wheel probe's shaft, either directly or using an appropriate mechanical linkage, can be used to controllably adjust the inspection angle as a function of a measured surface curvature.

Figure 7:
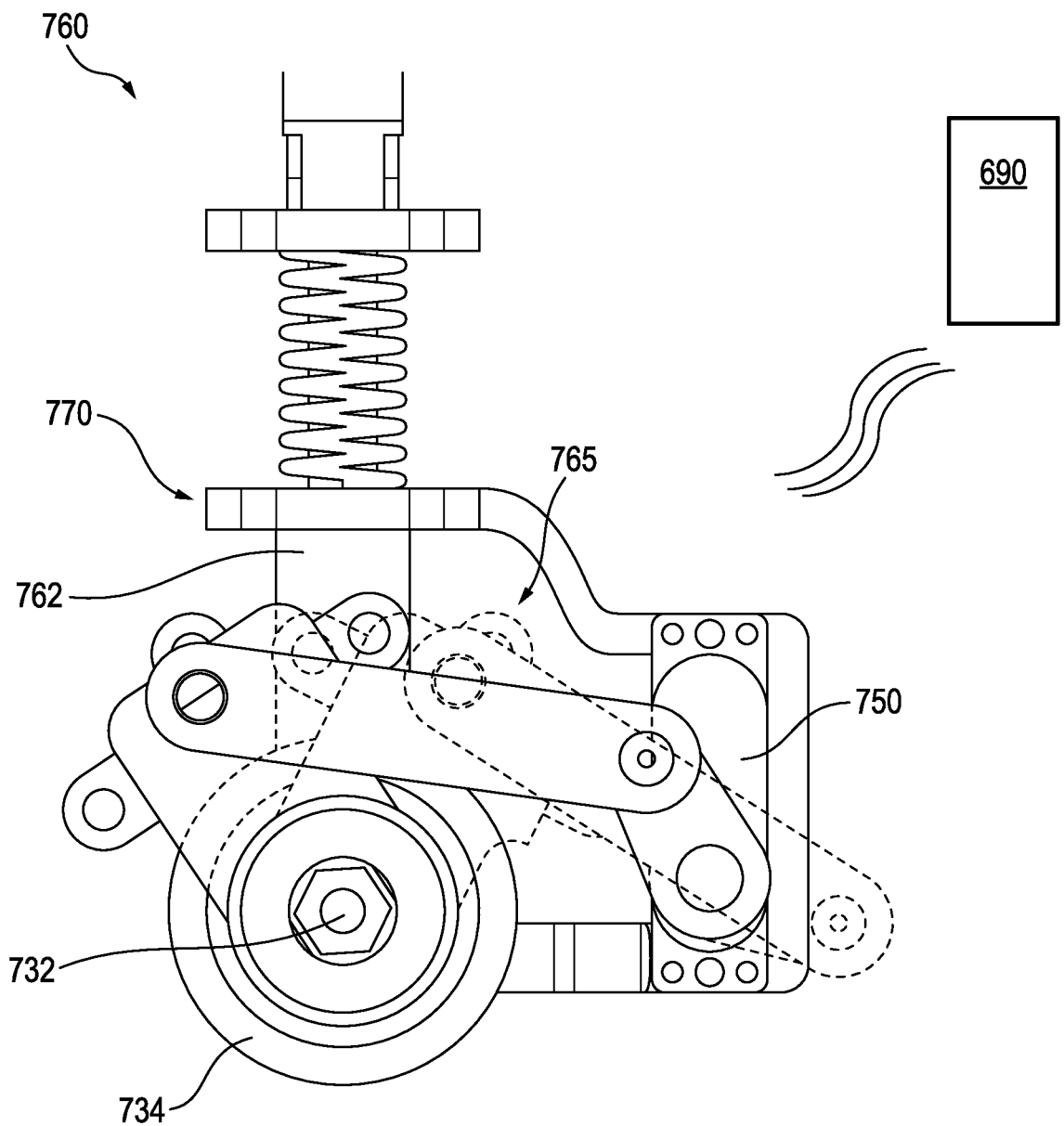
FIG. 7 is a side-view diagram of an exemplary motor-assisted probe normalization mechanism in accordance with one or more disclosed embodiments.

For example, as shown in FIG. 7, which is a close-up view of an exemplary motor-assisted and controlled probe normalization mechanism 760 for adjusting the inspection angle of a probe. Similar to the exemplary vehicle 100 described in conjunction with FIGS. 1A-1C, the probe comprises a probe wheel 734, rotating about a probe transducer shaft 732 and supported by a probe carrier 770 that is coupled to the chassis and configured to passively control the height of the probe using a spring mounting system. As shown, the normalization mechanism 760 includes a motor 750 that is mounted to the probe carrier 770 and is linked to the probe transducer shaft 732 through a slider-crank linkage system 765. The motor is configured to, based on suitably configured control signals received from the control computer 690, rotate an output drive shaft. The mechanical linkage system 765, coupled to the drive shaft, translates the rotation of the motor into rotation of the probe transducer shaft 732 so as to adjust the probe angle and provide active automatic normalization of the probe.

As can be appreciated from the exemplary embodiments disclosed above, the auto-probe normalization mechanisms are mechanically linked to the probe assembly and configured to, based on the passively sensed or actively measured surface curvature, maintain the probe at a prescribed inspection angle relative to the surface. The geometries of the auto-probe normalization mechanisms, including, the arrangement of linkage arms, their respective lengths, pivot points and other such parameters can be defined as a function of the vehicle configuration (e.g., size, shape and relative position of the vehicle's support wheels) and application-dependent requirements (e.g., the expected range of surface curvatures) as necessary to provide a suitably responsive auto-probe normalization mechanism capable of passively and/or actively adjusting the angle of the probe and maintaining a properly normalized probe relative to the surface.

It should be understood that various combination, alternatives and modifications of the present invention could be devised by those skilled in the art. The present invention is intended to embrace all such alternatives, modifications and variances that fall within the scope of the appended claims.

It is to be understood that like numerals in the drawings represent like elements through the several figures, and that not all components and/or steps described and illustrated with reference to the figures are required for all embodiments or arrangements.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A magnetic robotic crawler vehicle for traversing a surface, comprising:
    a chassis;
    a plurality of wheels mounted to the chassis and configured to traverse the surface during normal operation of the vehicle, the plurality of wheels including:
        two magnetic drive wheels, wherein the drive wheels are spaced apart in a lateral direction and rotate about a rotational axis and wherein the drive wheels are configured to be driven independently, thereby driving and steering the vehicle along the surface, and wherein a longitudinal axis of the vehicle extends perpendicularly to the lateral, rotational axis in a front and back direction and through the midpoint between the two drive wheels, and
        a stabilizing wheel, wherein the stabilizing wheel is spaced apart from the two magnetic drive wheels in the longitudinal direction and configured to roll along the surface;
    a sensor probe assembly supported by the chassis, wherein the sensor probe assembly comprises:
        a dry coupled wheel probe having a probe wheel rotating about a fixed probe transducer shaft, wherein the probe wheel is configured to passively roll generally in a direction of travel of the vehicle along the surface, and wherein a probe transducer within the probe transducer shaft is configured to measure characteristics of the surface at the prescribed angle, and wherein the sensor probe assembly is mounted to the chassis such that the probe transducer is positioned at the midpoint between the two drive wheels; and
    a probe normalization mechanism coupled to the sensor probe assembly, the probe normalization mechanism being configured to maintain at least the probe transducer of the sensor probe assembly at a prescribed angle relative to the surface during normal operation of the vehicle as a function of a curvature of the surface.

2. The magnetic robotic crawler vehicle of claim 1, further comprising:
    a sensor support moveably coupling the sensor probe assembly to the chassis, wherein the sensor support assembly is configured to passively move the probe assembly relative to the housing in at least the up and down direction in response to the curvature of the surface thereby maintaining the probe assembly in contact with the surface.

3. The magnetic robotic crawler vehicle of claim 2, wherein the sensor support comprises:
one or more shafts supporting the probe transducer shaft, the one or more shafts being coupled to the chassis by at least one mount, wherein the at least one mount is configured to allow the one or more shafts to move relative to the chassis in at least the up and down direction; and
one or more spring elements configured exert a force between at least the sensor probe assembly and the chassis that urges the probe wheel downward and into contact with the surface.

4. The magnetic robotic crawler vehicle of claim 1, wherein the probe normalization mechanism comprises:
a floating wheel assembly including a floating wheel configured to contact and move along the surface during normal operation of the vehicle, wherein the floating wheel is moveably coupled to the chassis and moveable relative to the chassis in at least an up and down direction in response to the curvature of the surface, wherein the up and down direction is generally perpendicular to both the longitudinal axis and the rotational axis; and
a mechanical linkage mechanically linking the floating wheel assembly and the probe assembly, wherein the probe normalization mechanism is passive in nature and wherein the mechanical linkage is configured to translate the movement of the floating wheel in at least the up and down direction into rotation of the transducer shaft about its central axis and at a rate that maintains the sensor probe assembly at the prescribed angle relative to the surface during normal operation of the vehicle as a function of the curvature of the surface.

5. The magnetic robotic crawler vehicle of claim 4, wherein the mechanical linkage comprises a multi-linkage system including,
a first linkage arm fixedly attached to the probe transducer shaft, and
a second linkage arm, wherein the second linkage arm is pivotably coupled at one end to the first linkage arm and pivotably coupled at another end to the floating wheel assembly.

6. The magnetic robotic crawler vehicle of claim 5, wherein the first and second linkage arms are joined together in a fixed relationship.

7. The magnetic robotic crawler vehicle of claim 5, wherein the floating wheel assembly moveably couples the floating wheel to the chassis and further comprises:
a wheel support shaft, the floating wheel being mounted to the wheel support shaft at one end thereof, and the wheel support shaft being coupled at a second end thereof to the chassis by a mount configured to allow the wheel support shaft to move linearly relative to the chassis in at least the up and down direction.

8. The magnetic robotic crawler vehicle of claim 7, wherein the wheel support assembly further comprises: one or more spring elements configured exert a force between the floating wheel assembly and the chassis that urges the floating wheel downward and into contact with the surface.

9. The magnetic robotic crawler vehicle of claim 7, wherein the linkage system is configured to rotate the transducer shaft about its central axis as a function of the movement of the floating wheel in the up and down direction.

10. The magnetic robotic crawler vehicle of claim 4, wherein the floating wheel is moveably coupled to the chassis by the mechanical linkage.

11. The magnetic robotic crawler vehicle of claim 4, wherein the floating wheel assembly and the probe wheel are arranged in-line.

12. The magnetic robotic crawler vehicle of claim 1, wherein the stabilizing wheel and the probe transducer are positioned at the longitudinal axis of the vehicle.

13. The magnetic robotic crawler vehicle of claim 1, wherein the stabilization wheel is a caster wheel positioned behind the drive wheel when the vehicle is traversing the surface.

14. The magnetic robotic crawler vehicle of claim 1, wherein the probe normalization mechanism comprises:
a distance sensor attached to the chassis and configured to measure a distance from the chassis to the surface; and
a computing device communicatively coupled to the distance sensor, the computing device including a processor configured by executing instructions to calculate the curvature of the surface based on the measured distance; and
a mechanical drive mechanism comprising an actuator or a motor, the mechanical drive mechanism being configured to, based on control signals generated by the computing device processor as a function of the calculated surface curvature, mechanically adjust an orientation of the sensor probe assembly relative to the surface.

15. The magnetic robotic crawler vehicle of claim 14, wherein the drive mechanism is a motor and wherein the probe normalization mechanism further comprises:
a mechanical linkage mechanically linking an output of the motor and the sensor probe assembly, wherein the mechanical linkage is configured to translate rotation of the motor output into rotation of the probe transducer shaft of the probe assembly about its central axis relative to the chassis.

* * * * *